March 14, 1939. S. B. SWAGGERTY 2,150,526
SUPPORTING AND APPLYING HARNESS FOR CRUPPERS
Filed June 23, 1936 2 Sheets-Sheet 1
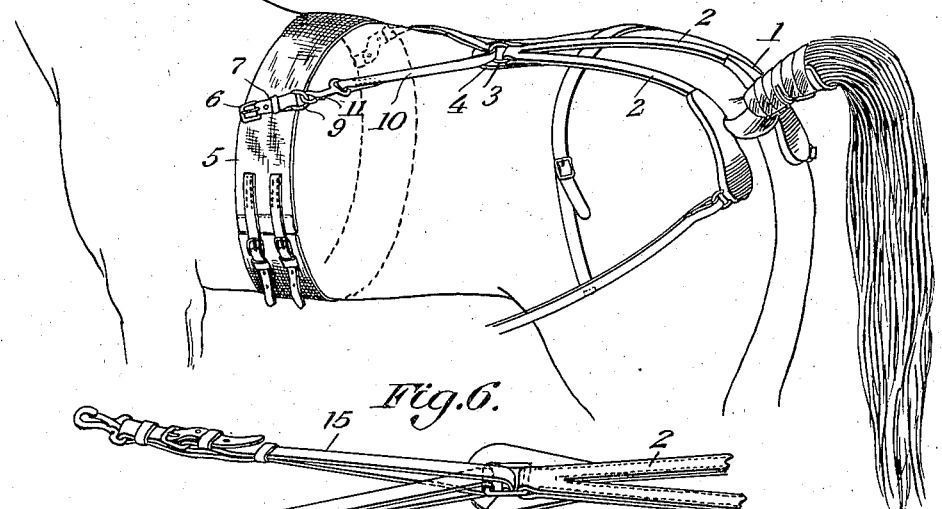
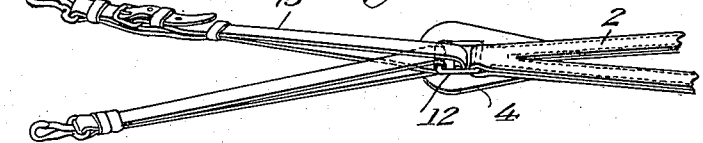
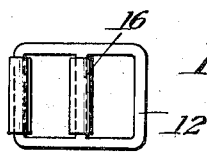
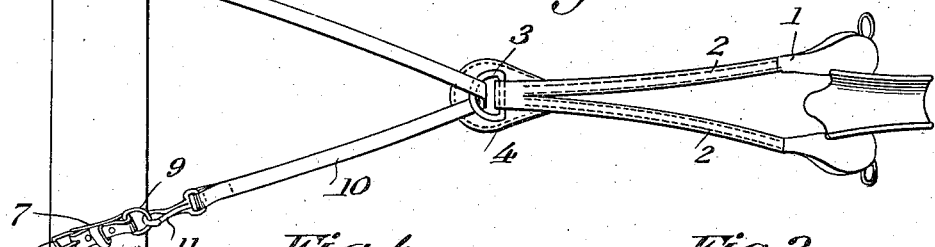
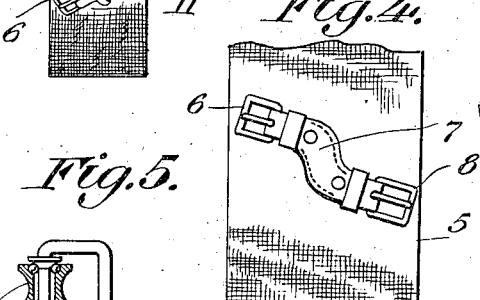
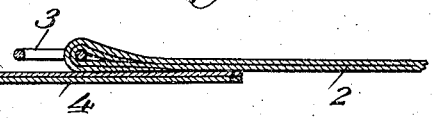
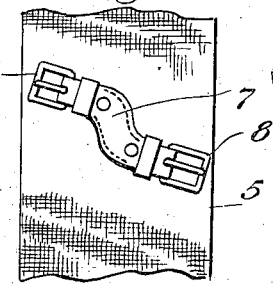
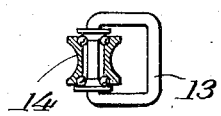
Stuart B. Swaggerty
INVENTOR
BY Victor J. Evans & Co.
ATTORNEYS March 14, 1939. S. B. SWAGGERTY 2,150,526
SUPPORTING AND APPLYING HARNESS FOR CRUPPERS
Filed June 23, 1936 2 Sheets-Sheet 2
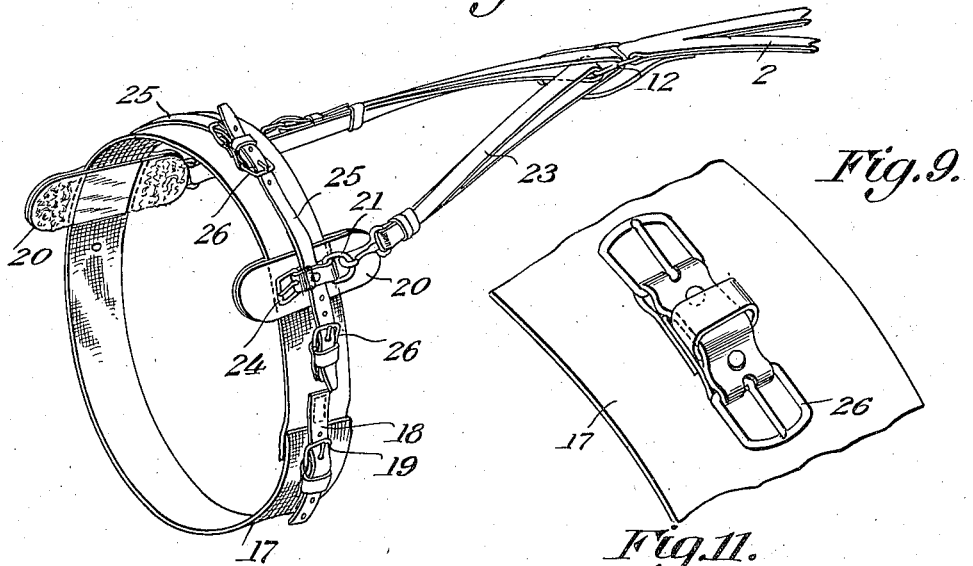
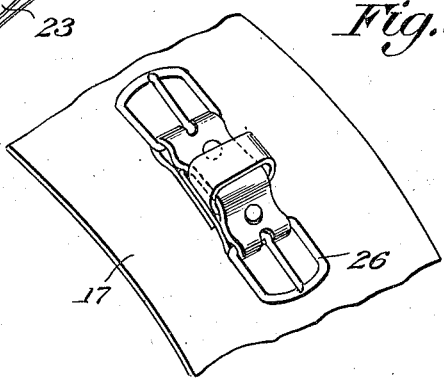
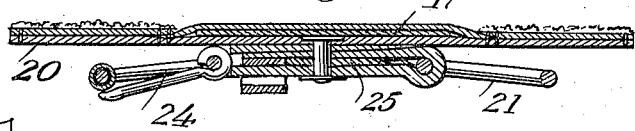
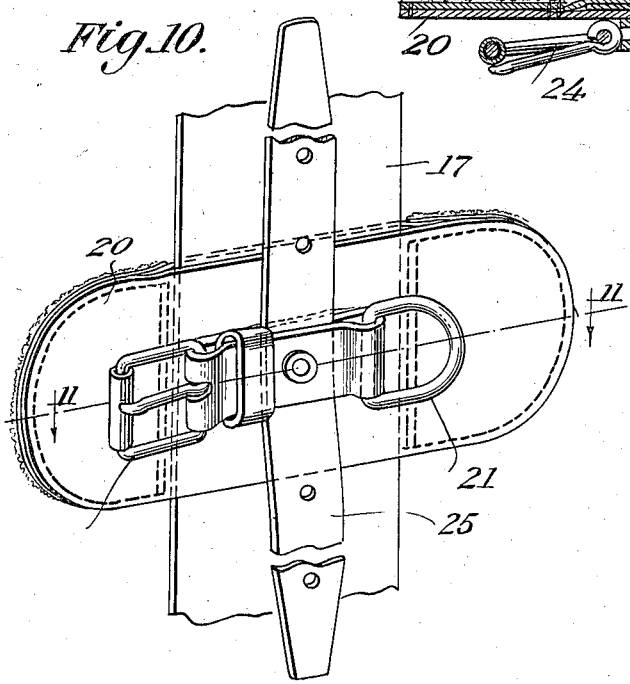
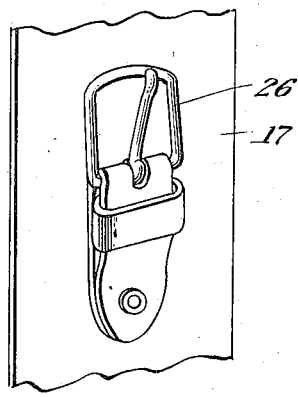
Stuart B. Swaggerty
INVENTOR
BY Victor J. Evans & Co.
ATTORNEYS Patented Mar. 14, 1939

2,150,526

UNITED STATES PATENT OFFICE 2,150,526

SUPPORTING AND APPLYING HARNESS FOR CRUPPERS

Stuart B. Swaggerty, Nashville, Tenn.; Emmaline Swaggerty administratrix of said Stuart B. Swaggerty, deceased Application June 23, 1936, Serial No. 86,875

3 Claims. (Cl. 54—78)

The invention relates to harness to be used in connection with cruppers of the type set forth in my United States Letters Patent granted February 12, 1935, and Number 1,991,299, and has for the primary object the provision of a simple and inexpensive device of this character which will maintain a crupper in proper position and prevent more pressure from being had on one buttock of a horse than the other during twisting movement of the horse's body and movements of the horse's head and neck to either side and also permits the surcingle to be made of lighter material and worn looser by the animal so as to reduce to a minimum any discomfort to the horse.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a fragmentary perspective view showing the application of my invention to a crupper and to a horse.

Figure 2 is a top plan view illustrating the device.

Figure 3 is a fragmentary sectional view showing a ring to permit free sliding movement of a connecting strap connected to the crupper strap and the surcingle.

Figure 4 is a fragmentary plan view illustrating a double buckle element employed on the surcingle.

Figure 5 is a plan view, partly in section, illustrating a modified form of my invention.

Figure 6 is a perspective view showing a modified form of my connecting strap employed to connect the crupper straps to the surcingle.

Figure 7 is a plan view showing a double ring used with the modified form of connecting strap.

Figure 8 is a perspective view illustrating a modified form of surcingle.

Figure 9 is a perspective view showing a pair of adjusting buckles employed on the surcingle shown in Figure 8.

Figure 10 is a fragmentary perspective view showing one of the adjusting means employed on the form of surcingle shown in Figure 8.

Figure 11 is a sectional view taken on the line 11—11 of Figure 10.

Figure 12 is a fragmentary perspective view showing another of the adjusting buckles employed on the form of surcingle shown in Figure 8.

Referring in detail to the drawings, the numeral 1 indicates a crupper forming the subject matter of my patent heretofore referred to and the supporting straps 2 thereof are connected with a ring 3 overlying a pad 4 secured to the supporting straps. The character 5 indicates a surcingle applied to a horse about the body in rear of the front leg to which other harness (not shown) such as a breast strap may be connected by buckles 6. These buckles are secured to the surcingle upon opposite sides of the horse's back by straps 7, the latter being riveted or otherwise secured to the surcingle. One of the straps is of a goose-neck formation, as shown in Figure 4, and has connected thereto a buckle 8, while the other strap 7 has connected thereto a ring 9. A connecting strap 10 passes through the ring 3 and one end has connected thereto a snap hook 11 engageable with a ring 9 and the other end of the connecting strap is adjustably connected to the buckle 8. During the movements of the body of the horse the strap 10 will slide freely through the ring 3, preventing the movements from being transmitted to the crupper, still said strap being connected with the ring 3 will maintain the crupper in proper position upon the buttocks of the horse. The strap sliding freely through the ring 3 during movements of the body of the horse will prevent the crupper from applying pressure to one buttock more than to the other.

The strap 7 of goose neck formation prevents other straps of harness worn by the horse from being placed directly over the end of the strap 10 connected to the buckle 8.

Instead of employing the ring 3 a double ring 12 may be substituted in lieu thereof or a ring 13 may be employed on which is journaled a pulley 14. The pulley may be of the construction shown in Figure 5, that is, employing anti-friction bearings or the bearings may be eliminated or the pulley may be of the deep groove type so that a round connecting strap may be employed in lieu of the strap 10, which in this instance is of the flat type.

The double ring 12 is employed with a strap 15 of a double construction, as shown in Figure 6. The double ring 12 has sleeves 16 and they may be mounted thereon by anti-friction bearings (not shown).

Securing a crupper to a surcingle by a construction heretofore described will permit the animal to have more comfort due to the fact that the crupper will not be disturbed by movements of the horse and will permit the surcingle to be made of lighter material and is better adapted to the horse than heretofore possible with harness employed in securing cruppers in position.

Referring to my modified form of invention as shown in Figures 8 to 12, inclusive, the character 17 indicates a surcingle preferably constructed of light weight material having the ends thereof adjustably connected by a strap 18 and a buckle 19, the buckle being secured to the surcingle 17 adjacent one end while the strap 18 is secured to the surcingle adjacent its other end. Padded plate-like members 20 are slidably mounted on the surcingle and when the device is in use the plate-like members engage the animal's sides and connected thereto are rings 21 to be engaged by the fasteners of a connecting strap 23. The connecting strap 23 may be of the type shown in Figure 6 or the type shown in Figure 2. Also connected to the plate-like members 20 are buckles 24 to which may be connected breast straps or similar devices (not shown). The plate-like members may be adjusted on the surcingle upwardly and downwardly with respect to the sides of the animal and held in their adjusted positions by straps 25 connected thereto and to buckles 26 secured to the surcingle. The plate-like members 20 permit the device to be readily adaptable to animals of different sizes and also permits the surcingle to be more comfortably worn by the animal due to the fact that it is not necessary to tightly fasten the surcingle about the body of the animal and with the breast strap (not shown) connected to the plate-like members strain will be materially removed from the surcingle.

Having described the invention, I claim:

1. In combination with a crupper and a surcingle, a connecting strap slidably connected to the front end of the crupper, plate-like members slidably connected to the surcingle and having the ends of the strap connected thereto, and means for securing the plate-like members in their adjusted positions.

2. In combination with a crupper and surcingle, a connecting strap slidably connected to the front end of the crupper, plate-like members slidably connected to the surcingle and having the ends of the strap connected thereto, buckles secured to the surcingle, and straps secured to the plate-like members and connected to the buckles.

3. In combination with a crupper and surcingle, a connecting strap slidably connected to the front end of the crupper, plate-like members slidably connected to the surcingle and having the ends of the strap connected thereto, buckles secured to the surcingle, and straps secured to the plate-like members and connected to the buckles, and buckles secured to the plate-like members for connecting a breast strap thereto.

STUART B. SWAGGERTY.